(No Model.) 2 Sheets—Sheet 1.
W. E. COWAN.
CONDUIT WIRING MACHINE.
No. 603,623. Patented May 10, 1898.
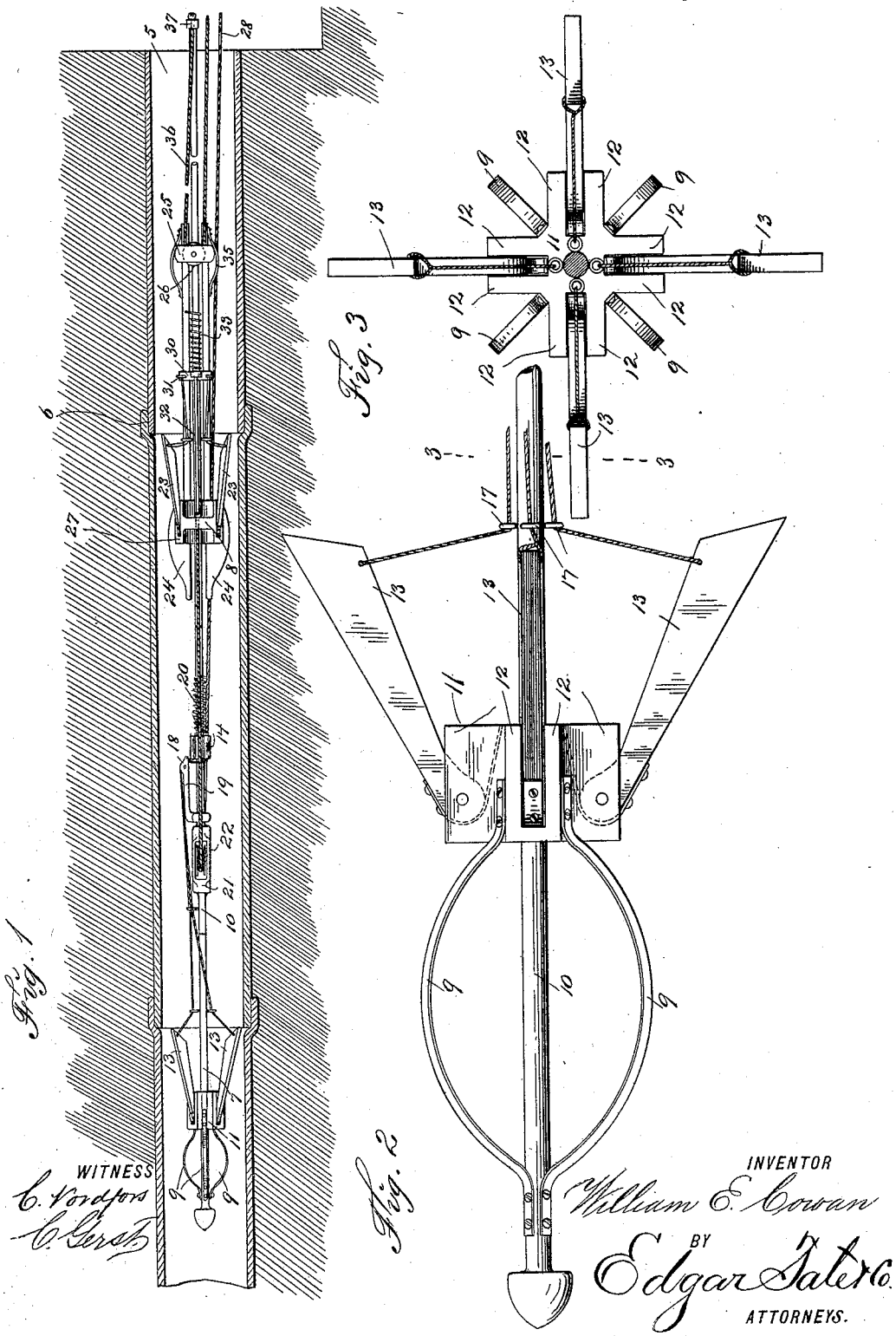
WITNESS
INVENTOR
William E. Cowan
BY
Edgar Tate & Co.
ATTORNEYS.

(No Model.) 2 Sheets—Sheet 2.

W. E. COWAN.
CONDUIT WIRING MACHINE.

No. 603,623. Patented May 10, 1898.

WITNESSES:
C. Tordfors
C. Gerst

INVENTOR
William E. Cowan.
BY
Edgar Tate & Co.
ATTORNEYS.

UNITED STATES PATENT OFFICE.

WILLIAM E. COWAN, OF BROOKLYN, NEW YORK.

CONDUIT-WIRING MACHINE.

SPECIFICATION forming part of Letters Patent No. 603,623, dated May 10, 1898.

Application filed August 27, 1897. Serial No. 649,781. (No model.)

*To all whom it may concern:*

Be it known that I, WILLIAM E. COWAN, a citizen of the United States, residing at Brooklyn, in the county of Kings and State of New York, have invented certain new and useful Improvements in Conduit-Wiring Machines, of which the following is a full and complete specification, such as will enable those skilled in the art to which it appertains to make and use the same.

This invention relates to a conduit-wiring machine, and more particularly to that class thereof which is adapted for use in subway-conduits of small dimensions.

The object of the invention is to provide a machine which will carry a rope through a conduit of the above-described class with a reduced amount of labor and notwithstanding that the different sections of the conduit may not be in proper alinement.

A further object of the invention is to provide means whereby a rope may be drawn through said conduit with ease notwithstanding any adamantine surface with which the conduit may be interiorly provided, a still further object being to provide a machine which may be readily withdrawn when desired and which is simple in construction and operation, efficient in practice, and inexpensive to manufacture.

The invention consists in the novel features of construction hereinafter set forth and described, and more particularly pointed out in the claims hereto appended.

Figure 4:
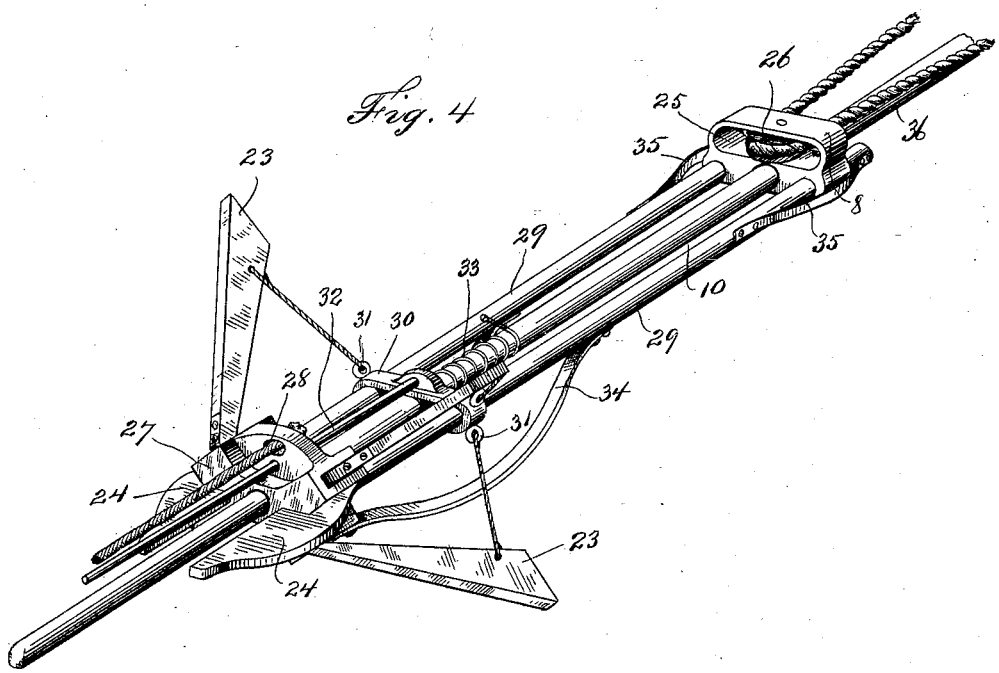
Figure 5:
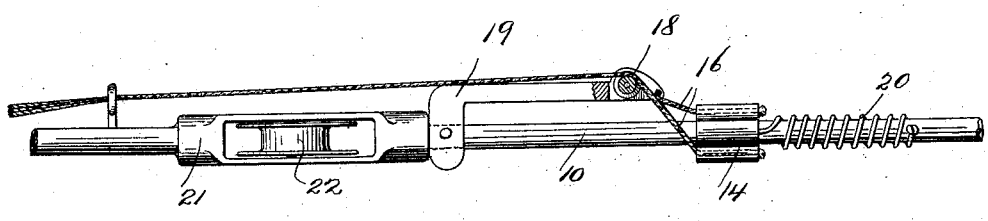
Figure 6:
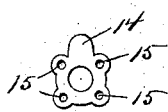

Referring to the accompanying drawings, Figure 1 is a sectional view of a portion of a conduit, showing my improved wiring-machine in its position relative thereto. Fig. 2 is an enlarged view of the guide portion of said machine; Fig. 3, a section on the line 3 3 of Fig. 2; Fig. 4, a perspective view of the rope-carrier; Fig. 5, a detail view of a section of the sliding rod, and Fig. 6 an end view of the collars shown in Fig. 5.

Like numerals refer to like parts throughout the several views.

In the accompanying drawings, 5 denotes an ordinary metallic conduit composed of sections united by means of screw-joints 6. These conduits in the ordinary construction are made of metal and provided interiorly with a hardened surface, which in many instances is glazed to facilitate drawing rope and wire therethrough.

My improved conduit-wiring machine may be divided into two elements—a guide 7 and a rod-carrying section 8.

The guide 7 is composed of runners 9, preferably four in number and attached firmly to the rod 10 and to a collar 11, rigidly mounted on said rod. These runners may be made of bar metal, as shown in the accompanying drawings, or may be made in the shape of flanges made integral with or attached to said rod. The collar 11 has a series of flanges 12, forming jaws, within which is pivoted a finger, as 13, which is forced outwardly by means of a spring attached thereto and seated within the jaws 12. The fingers 13, four in practice preferably, form a clutch which will engage the interior of a conduit which is not too hard, but which excepting for the peculiar construction thereof would not engage the ordinary conduit as herein described.

To render my machine suitable for use in any conduit, I form the outer extremities of the fingers 13 into an acute angle of approximately forty-five degrees, this presenting a sharp edge which will readily engage in an exposed screw-thread, into a joint formed in uniting the pipe, or in any abrasion within said conduit.

14 denotes a sliding collar having attached thereto one end of a spring and provided with a series of openings 15, which are adapted to receive one end of a string or wire which is adapted to engage the fingers 13. The strings 16, attached to said collar 14 and to the fingers 13, pass through eyelets 17 and over a pulley 18, seated in bearings on an arm 19, made integral with or rigidly attached to the rod 10. The spring 20, which is attached to the collar 14, is coiled about the rod 10 and attached thereto, so that normally the collar 14 will maintain the position shown in Fig. 1. At a suitable point on the rod 10 near the guide 7 I provide an enlarged portion 21, having an opening therein, in which is mounted a pulley 22.

The rope-carrier 8 is provided with fingers 23, corresponding in construction and arrangement and number to the fingers 13, already described. This section is provided with guide-plates 24, which are adapted to hold said sections in the proper relation to the conduit and also to act upon the sliding collar 14 in a manner hereinafter described. This portion is provided with a butt 25, in which is mounted the rope-carrier pulley 26, and which is provided with an opening through which the rod 10 is adapted to slide. The collar 27, bearing the fingers 23, has also an opening therein, through which the rod 10 is designed to slide, and an opening in the upper part thereof adapted to receive and hold a rope, as 28. The finger-bearing collar 27 is attached to the rope-bearing butt 25 by means of rigid connections, preferably rods, as 29, two in number and rigidly attached to each of said portions. On these rods 29 or their equivalents is a sliding collar 30, which is provided with eyelets 31, adapted to be connected to the fingers 23 by means of suitable ropes or chains. This collar has mounted thereon a rod 32, which projects through said collar and is adapted by contact with the collar 14 to depress the spring 33 and draw the fingers 23 out of contact with the conduit. This spring 33, although shown encompassing the rod 10 and attached to one of the rigid rods 29, may be mounted upon the rod 32 or in any other suitable relation which will automatically restore the various parts to their normal positions, which permits of continuous contact with the interior of the conduit.

Each of the rods 29 is preferably provided with a runner, as 34, and with side guides 35, surrounding the butt 25.

36 denotes the rope which it is desired to draw through the conduit.

In Fig. 1 the rope 28 is shown extending to the manhole, in which it is presumed that the machine is to be inserted.

The rod 10 is preferably made in short lengths, so as to be readily handled in a manhole, said lengths being preferably of about twelve inches and attached to each other by means of a screw-thread and corresponding coöperating sockets. The length of the rod 10 can therefore vary according to the length of pipe used in forming the conduit, it being preferably of sufficient length to bring both the guides and the rope-carrier clutches, respectively, in binding contact with a joint in said conduit. The end portion of this rod is provided with a suitable collar or other device 37, by means of which the rope 36 is attached thereto, and said rod is preferably made of a resilient material which will permit the following of a conduit the pipes of which are not in perfect alinement or having portions therein which are depressed or elevated in order to pass over or under other pipes which have a prescriptive right.

The operation of my improved conduit-wiring machine when used in relation to subway-conduits is as follows: The guide 7 is first inserted in the opening exposed in the manhole and sections of the rod added consecutively until there is sufficient room to mount the rope-carrier 8 on said rod. This is then done and other sections of the rod added until the desired length is attained. Then the machine is forced within the conduit by any desired means until the fingers 13 come in contact with the second joint, as shown in Fig. 1. The expansion of the fingers 13, occasioned by the springs seated between the jaws 12, securely clutches the conduit at the exposed portions occasioned by the joint or by exposed screw-threads therein, thus holding said guide firmly in this position. By pulling the rope 28, which passes over the pulley 22 and is attached to the carrier 8, the carrier is introduced within said cavity until it catches on a joint in said conduit in a similar manner to that of the clutches of the guide 7. Then by pulling on the free end of the rope 36, which is attached to the extremity of the rod 10, the guide 7 is forced within said cavity to the full extent of said rod or until the next joint is reached. The operation, as before described, is then repeated, and can be carried on in this manner for any desired length of conduit, thus carrying the rope 36 through the same with great ease.

If it is desired for any reason to withdraw the machine from the conduit, it is merely necessary to bring the guide and the carrier-section together, thus forcing the collar 14 against the arm 19 by reason of the guides 24 on the carrier-section. The rod 32, coming in contact with said collar, will force the sliding plate 30 backward against the tension of the spring 33. The sliding collar 14 and the sliding plate 30 being attached, respectively, to each of the fingers 13 and 23, said fingers by this operation will be drawn out of contact with the walls of the conduit, and by preventing the ropes 28 and 36 from slipping in any way said machine may be drawn to the manhole and removed, the various guides facilitating this removal in the same manner as they do the insertion of the machine into the conduit. The springs 20 and 33 operate, respectively, to restore the collar 14 and the sliding plate 30 to their former position, thus leaving the fingers 13 and 23, respectively, free to operate upon the interior of the conduit.

By the above-described means the objects of my invention are attained. I have produced a machine which by reason of its simple construction and operation of parts will readily string a wire in any conduit with comparative ease.

The machine may be used as readily in a conduit presenting interiorly a hardened surface as in an earthenware conduit or a conduit lined with material soft in its nature, that will follow the line of the conduit even though it be not in perfect alinement and which by reason of the resiliency of the rod 10 will readily follow bends or curves in the conduit without destroying the machine.

A conduit-wiring machine is also produced which can be readily withdrawn without injury to the conduit and without delay or inconvenience to the operator.

It is to be understood that it is not my intention to limit my invention to the precise construction herein shown and described, as there may be many variations therein not in themselves amounting to invention which will come within the scope and spirit of my invention.

Having fully described my invention, I claim as new and desire to secure by Letters Patent—

1. In a conduit-wiring machine, a guide-section, runners thereon a rope-carrying section, a rod and clutches whereby each of the aforesaid sections may be rigidly attached to the interior of a conduit, and means whereby the sections may be alternately introduced within said conduit, by means of said rod, and means whereby said clutches can be withdrawn from contact with the conduit, substantially as shown and described.

2. In a conduit-wiring machine, a guide-section, runners thereon, a rope-carrier, a rod carrying said guide and said runners, clutches on said guide and said carrier respectively, and means whereby said guide and said carrier may be forced alternately within a conduit, substantially as described.

3. In a conduit-wiring machine, a guide-section, runners thereon a rope-carrier section, a rod carrying said guide-section, clutches consisting substantially of fingers pivoted to said guide and rope-carrier sections respectively, means whereby said fingers automatically expand into contact with the conduit, and means whereby said guide and rope-carrier sections may be forced alternately within said conduit, substantially as described.

4. In a conduit-wiring machine, a guide-section, runners thereon a rope-carrier section, a rod carrying said guide-section, clutches consisting substantially of fingers pivoted to said guide and rope-carrier sections respectively, springs whereby said fingers automatically expand into contact with the conduit, and means whereby said guide and rope-carrier sections may be forced alternately within said conduit, substantially as described.

5. In a conduit-wiring machine, a guide-section, runners thereon a rope-carrier section, a rod carrying said guide-section, clutches consisting substantially of fingers pivoted to said guide and rope-carrier sections respectively, means whereby said fingers automatically expand into contact with the conduit, and means whereby said guide and rope-carrier sections may be forced alternately within said conduit, sliding collars, connections between said collars and the said fingers, and means whereby when said guide and said rope-carrier sections are brought together, said collars will slide to compress said fingers, substantially as shown and described.

6. In a conduit-wiring machine, a guide-section, runners thereon a rope-carrier section, a rod carrying said guide-section, clutches consisting substantially of fingers pivoted to said guide and rope-carrier sections respectively, means whereby said fingers automatically expand into contact with the conduit, and means whereby said guide and rope-carrier sections may be forced alternately within said conduit, sliding collars, connections between said collars and the said fingers, a rod attached to one of said collars and projections on the rope-carrier, substantially as shown and described.

7. In a conduit-wiring machine, a guide-section, runners thereon a rope-carrier section, a rod carrying said guide-section, clutches consisting substantially of fingers pivoted to said guide and rope-carrier sections respectively, means whereby said fingers automatically expand into contact with the conduit, and means whereby said guide and rope-carrier sections may be forced alternately within said conduit, sliding collars, connections between said collars and the said fingers, and means whereby when said guide and said rope-carrier sections are brought together, said collars will slide to compress said fingers, and means whereby said collars automatically release said fingers when said sections are separated, substantially as described.

8. In a conduit-wiring machine, a guide-section, runners thereon a rope-carrier section, a rod carrying said guide-section, clutches consisting substantially of fingers pivoted to said guide and rope-carrier sections respectively, means whereby said fingers automatically expand into contact with the conduit, and means whereby said guide and rope-carrier sections may be forced alternately within said conduit, sliding collars, connections between said collars and the said fingers, and means whereby when said guide and said rope-carrier sections are brought together, said collars will slide to compress said fingers, and springs whereby said collars automatically release said fingers when said sections are separated, substantially as described.

9. In a conduit-wiring machine, a guide-section, runners thereon a rod carrying said section, a pulley thereon, a rope-carrier section, a pulley thereon, clutches on said guide and said rope-carrier sections, and means as ropes 28, 36, attached respectively to said rope-carrier and said rod, and passing over said pulleys respectively, whereby said sections may be alternately forced within the conduit, substantially as described.

In testimony that I claim the foregoing as my invention I have signed my name, in presence of the subscribing witnesses, this 25th day of August, 1897.

WILLIAM E. COWAN.

Witnesses:
C. GERST,
A. C. VAN BLARCOM.